(12) United States Patent
Gates et al.

(10) Patent No.: US 8,798,069 B2
(45) Date of Patent: Aug. 5, 2014

(54) SYSTEM FOR ALLOCATING CHANNELS IN A MULTI-RADIO WIRELESS LAN ARRAY

(71) Applicants: Dirk Ion Gates, Westlake Village, CA (US); James Kirk Mathews, Hidden Hills, CA (US)

(72) Inventors: Dirk Ion Gates, Westlake Village, CA (US); James Kirk Mathews, Hidden Hills, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 18 days.

(21) Appl. No.: 13/732,841

(22) Filed: Jan. 2, 2013

(65) Prior Publication Data
US 2013/0343210 A1    Dec. 26, 2013

Related U.S. Application Data

(63) Continuation of application No. 11/816,065, filed on May 13, 2008, now abandoned.

(51) Int. Cl.
*H04L 12/56* (2006.01)
(52) U.S. Cl.
USPC .......................................................... 370/392

(58) Field of Classification Search
USPC .......................................................... 370/392
See application file for complete search history.

(56) References Cited

U.S. PATENT DOCUMENTS

| 6,157,811 | A | * | 12/2000 | Dent | 455/12.1 |
|---|---|---|---|---|---|
| 2002/0186678 | A1 | * | 12/2002 | Averbuch et al. | 370/347 |
| 2004/0242272 | A1 | * | 12/2004 | Aiken et al. | 455/562.1 |
| 2005/0058097 | A1 | * | 3/2005 | Kang et al. | 370/329 |
| 2006/0109799 | A1 | * | 5/2006 | Tseng et al. | 370/254 |
| 2006/0233280 | A1 | * | 10/2006 | Tynderfeldt et al. | 375/299 |

* cited by examiner

*Primary Examiner* — Shripal Khajuria
(74) *Attorney, Agent, or Firm* — Francisco A. Rubio-Campos; The Eclipse Group LLP

(57) ABSTRACT

A channel allocation system for allocating channels in a frequency band to a plurality of radios in close proximity so as to minimize co-channel interference. One method for allocating channels involves initially tuning each of the plurality of radios to the same one of the plurality of channels. All of the radios then receive signals from whatever sources and a signal score is determined for each radio. The radios are then tuned to another one of the plurality of channels. The steps of receiving a signal and determining a signal score for each radio are repeated for each of the remaining channels until all channels have been used. The signal scores are then tested against a table of mapping schemes to determine maximum isolation.

3 Claims, 13 Drawing Sheets

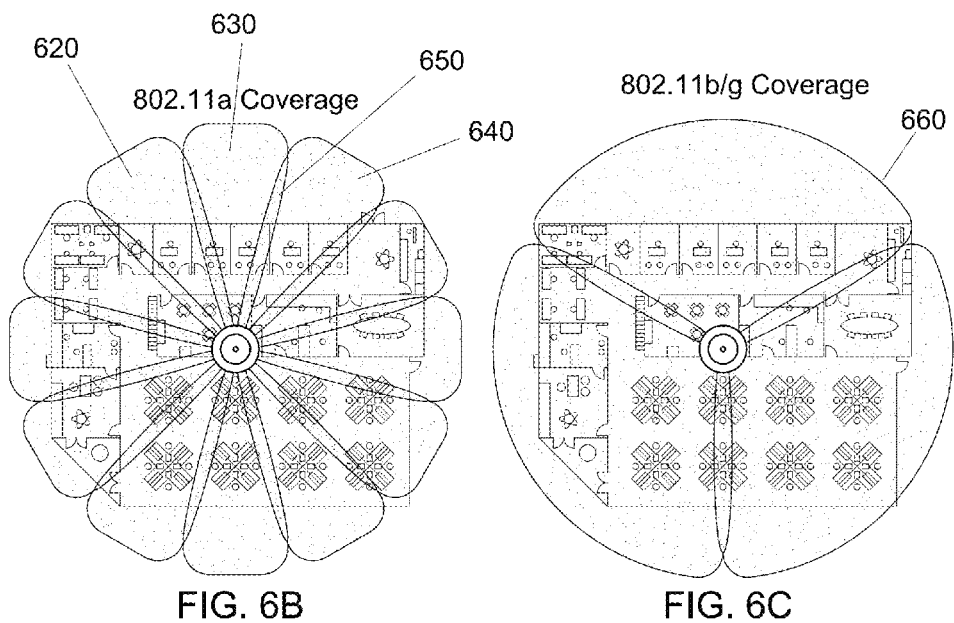
FIG. 6B
FIG. 6C
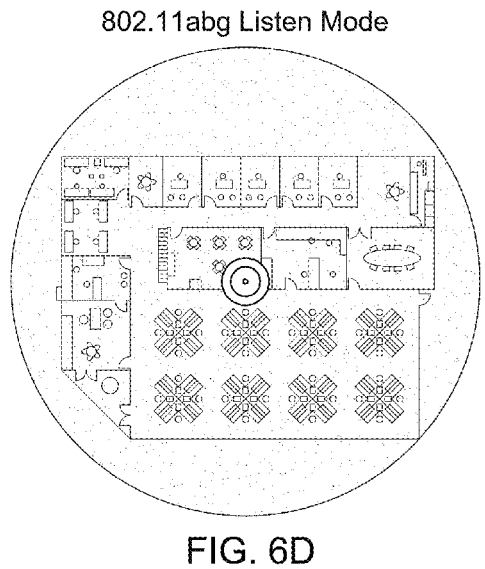
FIG. 6D

SYSTEM FOR ALLOCATING CHANNELS IN A MULTI-RADIO WIRELESS LAN ARRAY

CROSS REFERENCE TO RELATED APPLICATIONS

This application is a continuation application of U.S. patent application Ser. No. 11/816,065 titled "SYSTEM FOR ALLOCATING CHANNELS IN A MULTI-RADIO WIRELESS LAN ARRAY", filed on May 13, 2008 by inventors Dirk I. Gates and James T. Mathews, the contents of which are incorporated herein by reference in its entirety.

This application further claims priority of the following provisional patent applications:
1. Prov. App. Ser. No. 60/660,171, titled "Wireless LAN Array," by Dirk I. Gates, Ian Laity, Mick Conley, Mike de la Garrigue, and Steve Smith, filed on Mar. 9, 2005;
2. Prov. App. Ser. No. 60/660,276, titled "Wireless LAN Array," by Dirk I. Gates, Ian Laity, Mick Conley, Mike de la Garrigue, and Steve Smith, filed on Mar. 9, 2005;
3. Prov. App. Ser. No. 60/660,375, titled "Wireless Access Point," by Dirk I. Gates and Ian Laity, filed on Mar. 9, 2005;
4. Prov. App. Ser. No. 60/660,275, titled "Multi-Sector Access Point Array," by Dirk I. Gates Ian Laity, Mick Conley, Mike de la Garrigue, and Steve Smith, filed on Mar. 9, 2005;
5. Prov. App. Ser. No. 60/660,210, titled "Media Access Controller For Use In A Multi-Sector Access Point Array," by Mike de la Garrigue and Drew Bertagna filed on Mar. 9, 2005;
6. Prov. App. Ser. No. 60/660,174, titled "Queue Management Controller For Use In A Multi-Sector Access Point Array," by Mike de la Garrigue and Drew Bertagna filed on Mar. 9, 2005;
7. Prov. App. Ser. No. 60/660,394, titled "Wireless LAN Array," by Dirk I. Gates, Ian Laity, Mick Conley, Mike de la Garrigue, and Steve Smith, filed on Mar. 9, 2005;
8. Prov. App. Ser. No. 60/660,209, titled "Wireless LAN Array Architecture," by Dirk I. Gates, Ian Laity, Mick Conley, Mike de la Garrigue, and Steve Smith, filed on Mar. 9, 2005;
9. Prov. App. Ser. No. 60/660,393, titled "Antenna Architecture of a Wireless LAN Array," by Abraham Hartenstein, filed on Mar. 9, 2005;
10. Prov. App. Ser. No. 60/660,269, titled "Load Balancing In A Multi-Radio Wireless Lan Array Based On Aggregate Mean Levels," by Mick Conley filed on Mar. 9, 2005;
11. Prov. App. Ser. No. 60/660,392, titled "Advanced Adjacent Channel Sector Management For 802.11 Traffic," by Mick Conley filed on Mar. 9, 2005;
12. Prov. App. Ser. No. 60/660,391, titled "Load Balancing In A Multi-Radio Wireless Lan Array Based On Aggregate Mean Levels," by Shaun Clem filed on Mar. 9, 2005;
13. Prov. App. Ser. No. 60/660,277, titled "System for Transmitting and Receiving Frames in a Multi-Radio Wireless LAN Array," by Dirk I. Gates and Mike de la Garrigue, filed on Mar. 9, 2005;
14. Prov. App. Ser. No. 60/660,302, titled "System for Allocating Channels in a Multi-Radio Wireless LAN Array," by Dirk I. Gates and Kirk Mathews, filed on Mar. 9, 2005;
15. Prov. App. Ser. No. 60/660,376, titled "System for Allocating Channels in a Multi-Radio Wireless LAN Array," by Dirk I. Gates and Kirk Mathews, filed on Mar. 9, 2005; and
16. Prov. App. Ser. No. 60/660,541, titled "Media Access Controller For Use In A Multi-Sector Access Point Array," by Dirk I. Gates and Mike de la Garrigue, filed on Mar. 9, 2005.

This application further claims priority to the following PCT patent applications:
1. PCT patent application no. PCT/US2006/008747, titled "Antenna Architecture of a Wireless LAN Array,"
2. PCT patent application no. PCT/US2006/008743, titled "Wireless LAN Array," filed on Mar. 9, 2006, which claims priority to the above provisional patent applications;
3. PCT patent application no. PCT/US2006/008696, titled "Assembly and Mounting for Multi-Sector Access Point Array," filed on Mar. 9, 2006;
4. PCT patent application no. PCT/US2006/08698, titled "System for Allocating Channels in a Multi-Radio Wireless LAN Array," filed Mar. 9, 2006; and
5. PCT patent application no. PCT/US2006/008744, titled "Media Access Controller for use in a Multi-Sector Access Point Array," filed on Mar. 9, 2006.

All of the above-listed US patent applications, US provisional patent applications, and PCT applications are incorporated by reference herein.

BACKGROUND OF THE INVENTION

1. Field of the Invention

The invention relates to wireless data communication systems and more particularly to systems and methods for providing access points in wireless local area networks.

2. Description of the Related Art

The use of wireless communication devices for data networking is growing at a rapid pace. Data networks that use "WiFi" ("Wireless Fidelity") are relatively easy to install, convenient to use, and supported by the IEEE 802.11 standard. WiFi data networks also provide performance that makes WiFi a suitable alternative to a wired data network for many business and home users.

WiFi networks operate by employing wireless access points to provide users having wireless (or 'client') devices in proximity to the access point with access to data networks. The wireless access points contain a radio that operates according to one of three standards specified in different section of the IEEE 802.11 specification. Radios in access points communicate using omni-directional antennas in order to communicate signals with wireless devices from any direction. The access points are then connected (by hardwired connections) to a data network system that completes the users' access to the Internet.

The three standards that define the radio configurations are:
1. IEEE 802.11a, which operates on the 5 GHz band with data rates of up to 54 Mbps;
2. IEEE 802.11b, which operates on the 2.4 GHz band with data rates of up to 11 Mbps; and
3. IEEE 802.11g, which operates on the 2.4 GHz band with data rates of up to 54 Mbps.

The 802.11b and 802.11g standards provide for some degree of interoperability. Devices that conform to 802.11b may communicate with 802.11g access points. This interoperability comes at a cost as access points will incur additional protocol overhead if any 802.11b devices are connected. Devices that conform to 802.11a may not communicate with either 802.11b or g access points. In addition, while the 802.11a standard provides for higher overall performance, 802.11a access points have a more limited range due to their operation in a higher frequency band.

Each standard defines 'channels' that wireless devices, or clients, use when communicating with an access point. The 802.11b and 802.11g standards each allow for 14 channels. The 802.11a standard allows for 12 channels. The 14 channels provided by 802.11b and g include only 3 channels that are not overlapping. The 12 channels provided by 802.11a are non-overlapping channels. The FCC is expected to allocate 11 additional channels in the 5.47 to 5.725 GHz band.

Access points provide service to a limited number of users. Access points are assigned a channel on which to communicate. Each channel allows a recommended maximum of 64 clients to communicate with the access point. In addition, access points must be spaced apart strategically to reduce the chance of interference, either between access points tuned to the same channel, or to overlapping channels. In addition, channels are shared. Only one user may occupy the channel at any give time. As users are added to a channel, each user must wait longer for access to the channel thereby degrading throughput.

As more and more users utilize access points for service, there is a need to increase the number of clients served by each access point and to maintain throughput even as the number of clients is increased.

SUMMARY

In view of the above, an example of a method consistent with the present invention is a method for allocating channels in a wireless access device having a plurality of radios capable of operating on a plurality of channels. Each channel has a frequency band with a center frequency. Each center frequency is spaced at equal frequency intervals within a larger frequency band. Any one channel may have at least one adjacent channel located in the next frequency band. The method includes allocating one of the plurality of channels to each one of the plurality of radios, where each of the allocated channels is not adjacent to any one of the other allocated channels.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 6B shows a coverage pattern formed by the twelve IEEE 802.11a radio types on the wireless access device.

FIG. 6C shows a coverage pattern formed by three IEEE 802.11a, b, or g radio types on the wireless access device.

FIG. 6D shows a coverage pattern formed by a single IEEE 802.11a, b, or g radio type on the wireless access device.

DETAILED DESCRIPTION

Figure 1:
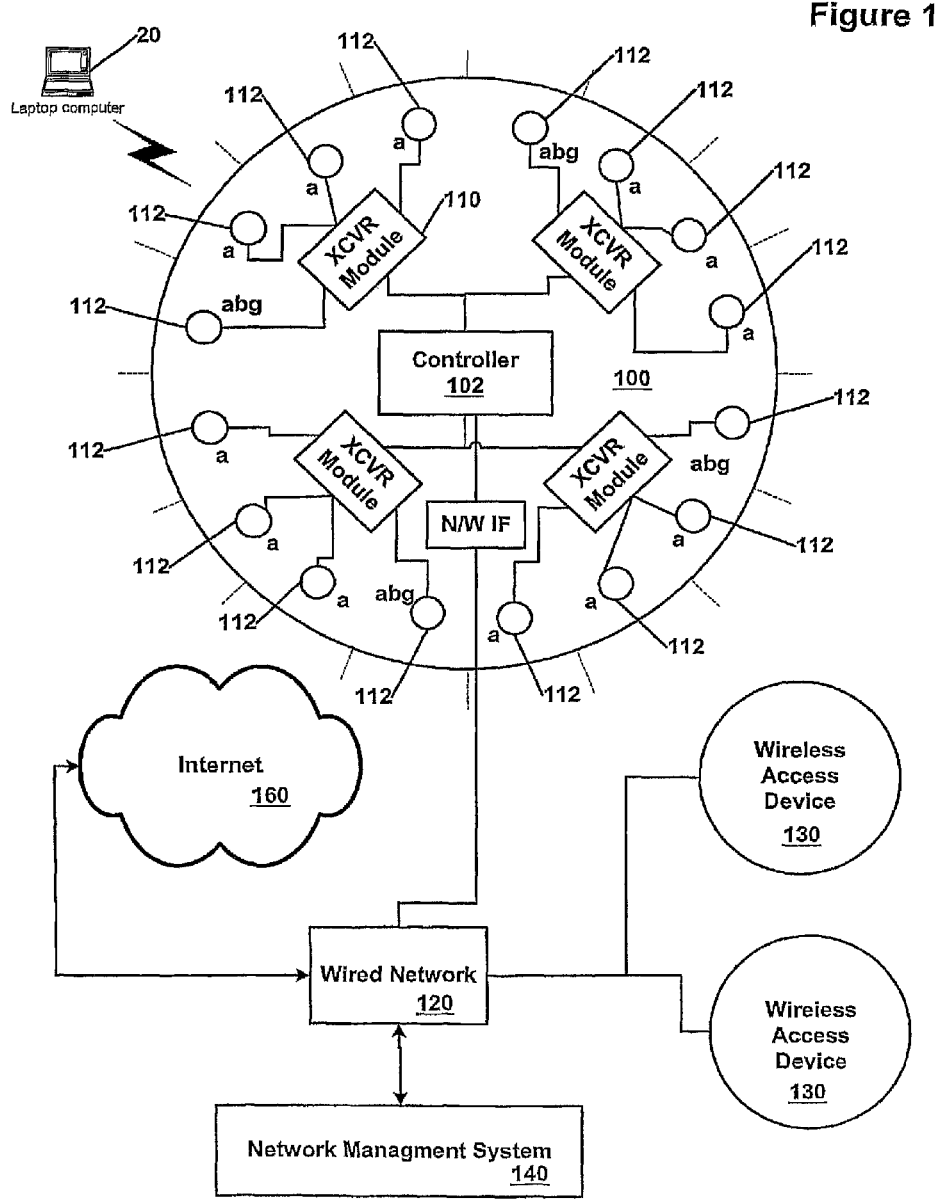
FIG. 1 is a block diagram of a network that uses a wireless access device.

FIG. 1 is a block diagram of network 10 that uses a wireless access device 100 to provide client devices (or "stations"), such as a laptop computer 20, access to data network services available on the Internet 160. The wireless access device 100 is connected to a wired network 120, which provides the connection to the Internet 160. Depending on the number of stations and the size of the area of coverage, the network 10 may include additional wireless access devices 130. A network management system 120 may be used to configure and manage the wireless access devices 100, 130.

The wireless access device 100 in FIG. 1 has a substantially circular structure 108 and includes an array controller 102, a plurality of transceiver modules 110, and a network interface 114. The transceiver modules 110 contain one or more transceivers, radios, for example, and each transceiver is connected to an antenna 112. The transceiver modules 110 are also connected to the array controller 102, which operates to configure the transceiver modules 110 and manage any communications connections involving the transceivers.

The wireless access device 100 shown in FIG. 1 has sixteen antennas 112. One of ordinary skill in the art will appreciate that any number of antennas may be used. The antennas 112 that correspond to the transceivers in the transceiver modules 110 are disposed near the perimeter of the substantially circular structure 108 of the wireless access device 100. The antennas 112 are preferably directional antennas configured to transmit and receive signals communicated in a radial direction from the center of the wireless access device 108. Each antenna 112 covers a portion of the substantially circular area surrounding the wireless access device 100 called a "sector" $S_i$. The total area covered by all of the sectors defines a 360° area of coverage of the wireless access device 100. This means that a station 20 located in a sector of the area of coverage would be able to communicate wirelessly with the antenna 112 corresponding with that sector. Multi-sector coverage is discussed in more detail below with reference to FIG. 4.

The network 10 in FIG. 1 implements well-known standards and protocols used to communicate over the Internet 160. The transceivers in the wireless access device 100 in FIG. 1 communicate with stations 20 in accordance with the IEEE 802.11 standard (802.11a, 802.11b, 802.11g), which is incorporated herein by reference. The remainder of this specification describes operation of examples of the wireless access device 100 in the context of systems that implement IEEE 802.11a, b, or g. However, the present invention is not limited to systems that implement any particular standard.

The wireless access device 100 in FIG. 1 has four transceiver modules 110. Each transceiver module 110 contains four transceivers, each of which is programmable. In a preferred configuration, three of the four transceivers (shown in FIG. 1 with antennas labeled 'a') in each transceiver module 110 are designated to operate as 802.11a radios. The remaining transceiver (shown in FIG. 1 with antenna labeled 'abg') may be programmed to operate according to any of 802.11a, b, or g. Each transceiver is configured to operate on an assigned channel. The channel may be one of the twelve channels available using the 802.11a standard or one of the fourteen channels available using the 802.11b/g standard.

The wireless access device 100 communicates with stations 20 wirelessly. The stations 20 may be any device enabled to communicate wirelessly with the wireless access device 100 such as, without limitation, laptop computers, mobile telephones (for voice-over-LAN, or VOWLAN applications), personal digital assistants, handheld computers, etc. In examples described here, the stations are enabled to operate in accordance with one or more of the 802.11 standards. When the station 20 enters the coverage area of the wireless access device 100, it may send a request to connect to the Internet 160. The wireless access device 100 may perform an authentication process in a login session. Once authenticated, the user of the station 20 may be connected to the Internet 160.

Figure 2:
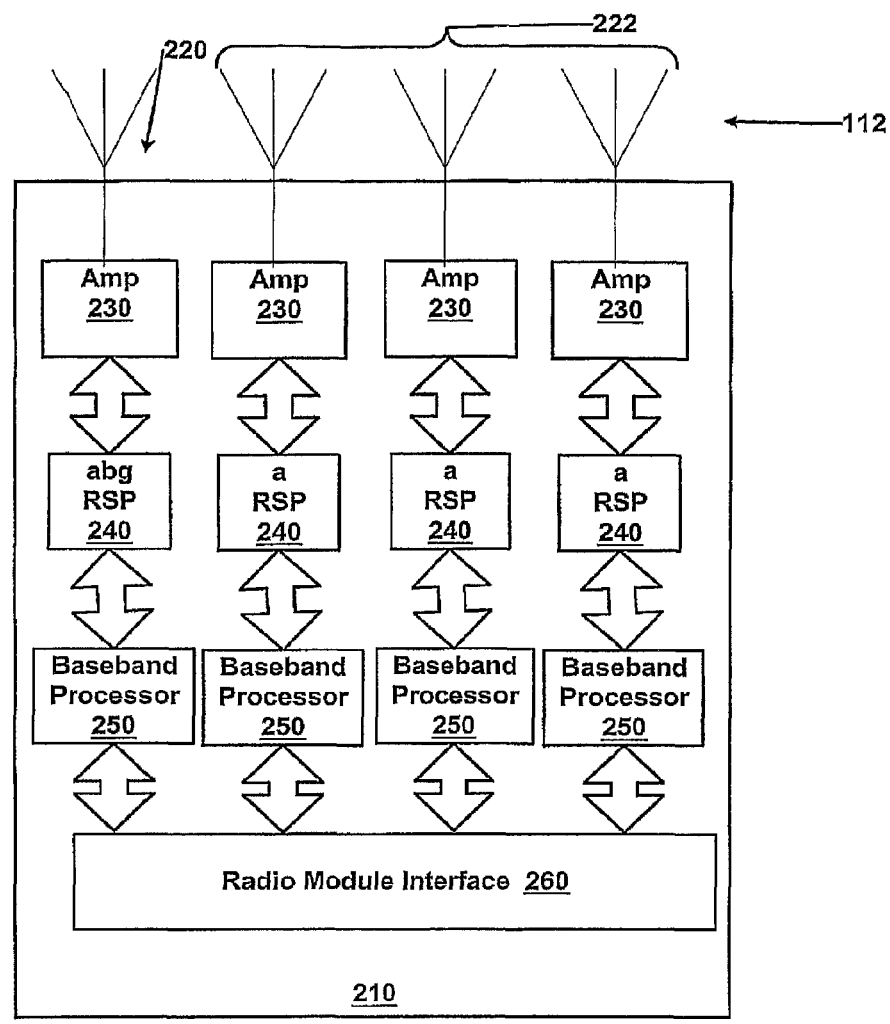
FIG. 2 is a block diagram of a transceiver module in the wireless access device in FIG. 1.

FIG. 2 is a block diagram of a transceiver module 210 that may be implemented in the wireless access device 100 shown in FIG. 1. The transceiver module 210 includes four radios, one of which is an 'abg' radio 220 and three of which are 'a' radios 222. All four radios 220, 222 include an amplifier 230, a radio signal processor 240, and a baseband processor 250. The four radios 220, 222 communicate with a transceiver module interface 260, which allows the transceiver module 210 to communicate with the rest of the wireless access device.

Each radio 220, 222 connects to an antenna 212, which transmits and receives radio signals received from the amplifier 230. As described with reference to FIG. 1, the antennas 212 are directional antennas, which concentrate signal power in one direction. Directional antennas can therefore cover greater distances than omni-directional antennas used in typical wireless access devices. The multiple radios with radially disposed directional antennas advantageously provides a 360° coverage pattern that is larger than that of radios with omni-directional antennas used in current access points.

The baseband processor 250 processes the digital data that is either being received or transmitted by the radio 220, 222. The baseband processor 250 implements protocols required for such functions as assembling/disassembling payloads. The baseband processor 250 performs the digital functions required to implement the 802.11 standard. Preferably, the baseband processor 250 is programmable and may be configured for any of the three standards (802.11a, 802.11b, 802.11g). One example of a baseband processor 250 that may be implemented is the Agere WL64040.

The radio signal processor 240 modulates signals to be transmitted and demodulates signals that have been received. The radio signal processor 240 is preferably programmable to implement either the modulation schemes specified by 802.11b/g or 802.11a. One example of a radio signal processor 240 that may be implemented is the Agere WL54040.

The amplifier 230 generates the radio signal to be transmitted by the transceiver 220, 222 and amplifies signals being received by the antenna 212. One example of an amplifier that may be implemented in the transceiver module 210 is the SiGe Semiconductor SE2535L for the 5 GHz or 802.11a radios, and the SiGe Semiconductor SE2525L for the 2.4 GHz or 802.11b/g radios.

In the transceiver module in FIG. 2, the amplifier 230, radio signal processor 240, and/or baseband processor 250 may be programmable so that the array controller 102 (in FIG. 1) may control the transceiver module 200 in a manner that provides certain features. For example, the array controller 102 (in FIG. 1) may control the amplifiers 230 in a manner that makes the coverage pattern of the wireless access device 102 larger or smaller depending on the needs of the implementation. In addition, the baseband processor 250 may communicate information (such as signal strength) about the radio connection between the wireless access device 100 and the stations 20.

It is noted that the following description refers to transceivers as radios. Those of ordinary skill in the art will appreciate that the term "radio" is not intended as limiting the transceiver to any particular type.

Figure 3:
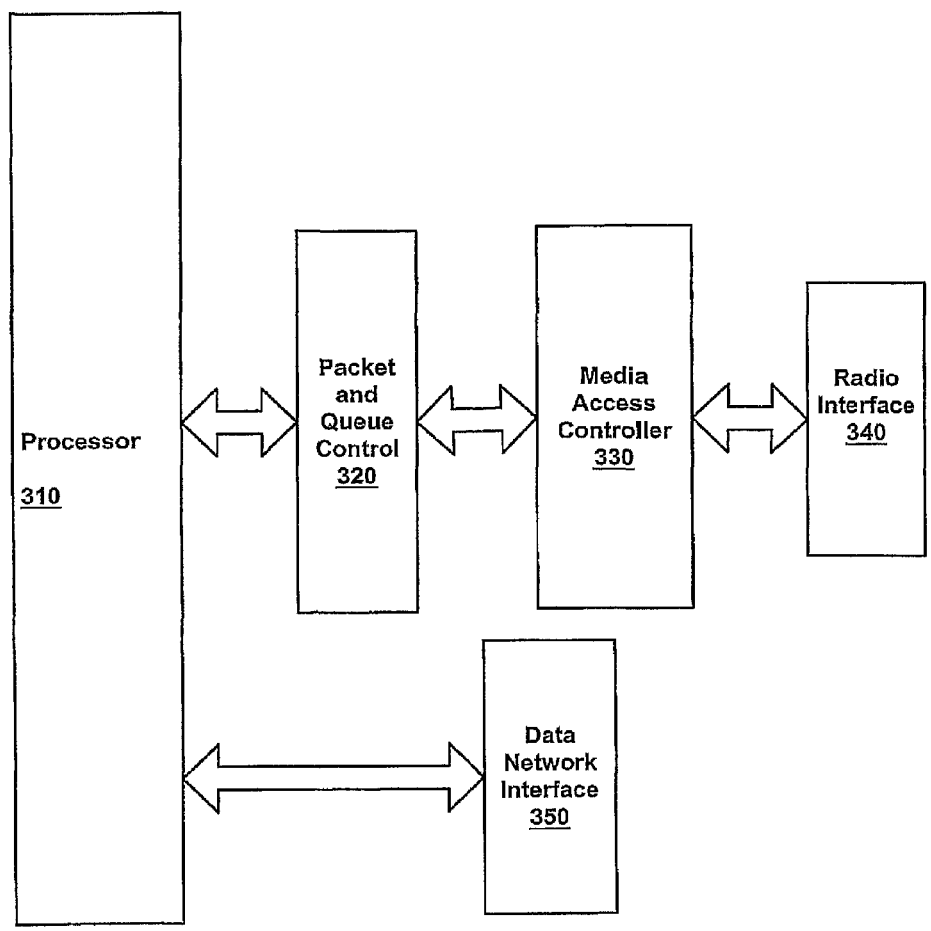
FIG. 3 is a block diagram of a controller in the wireless access device shown in FIG. 1.

FIG. 3 is a block diagram of an array controller 300 that may be implemented in the wireless access device 100 shown in FIG. 1. The array controller 300 includes a processor 310, a packet and queue controller 320, a medium access controller 330, a radio interface 340, and a data network interface 350.

The processor 310 provides computing resources to the wireless access device. The processor 310 may be any suitable custom or commercial microprocessor, microcontroller, computing chip or other type of processor. The array controller 300 also includes supporting circuitry for the processor 310 such as clock circuitry, I/O ports, memory (including Read Only Memory, or ROM, Random Access Memory, or RAM, Flash memory, Programmable Rom or PROM, etc.), direct memory access, etc. The processor 310 may also manage a bus system for communicating with its support circuitry and with the packet and queue controller 320, data network interface 350 and medium access controller 330. In one example, the processor 310 is a Motorola 8540 800 MHz CPU supported by 64 MB expandable system FLASH memory, 128 MB DDR 333 expandable system RAM, and a serial interface (RS232-RJ45 connector). An optional security co-processor may also be included.

The data network interface 350 includes input/output circuitry for communicating over a data network. The array controller 300 implements standards and protocols that allow for communication over the Internet. The data network interface 350 preferably allows for the highest possible speed connection. In one example, the data network interface 350 includes primary and secondary Gigabit Ethernet interfaces, a Fast Ethernet interface, and failover support between the Gigabit Ethernet interfaces.

The packet and queue controller 320 handles receiver and transmitter queues, performs DMA functions, resolves fragmentation, and performs packet translation. The medium access controller 330 provides all IEEE 802.11 MAC services for transceivers. For the wireless access device 100 in FIG. 1, the medium access controller 330 provides 802.11 MAC services for as many as sixteen transceivers. Both the packet and queue controller 320 and the medium access controller 330 are preferably implemented as application specific integrated circuits (ASIC).

The array controller 300 performs the programmed functions that control the wireless access device 100 as an access point. Functions and features of the operations that the array controller 300 performs include:

1. General implementation IEEE 802.11 Access Point functionality.
2. Non-blocking packet processing from/to any radio interface. In typical wireless access devices that employ a single, omni-directional radio, a packet that is being transmitted may block other packets from access to the medium. This may occur in either direction. Stations typically transmit packets to an access point when the medium is not busy. If the medium is busy with packets from other stations, for example, the packet is blocked. Similarly, the access point may be attempting to send a packet to a station. If other packets are being sent to another station, the original packet is blocked from access to the medium. In the wireless access device 100, when a station is blocked from communicating a packet to one radio, it may switch to another radio that is not blocked. If the wireless access device 100 is blocked from sending a packet via one radio, it may switch to another radio.
3. Dynamic automatic channel assignment. The array controller 300 implements algorithms and/or other schemes for assigning channels of the 802.11 standards to the multiple radios. Channels are allocated to radios in a manner that reduces adjacent channel interference (ACI).
4. Directional awareness of where a wireless station is in geographic relationship to the wireless access device 100. The array controller 300 receives information such as signal strength, and for each station, may keep track of how the signal strength changes over time. In addition, even if one radio is locked in and "connected" to a station, another radio may receive signals and thus, "listen" to the station. The signal strength in relation to the specific radios gathering signal information provide the array controller with sufficient information to create a directional awareness of the location of the wireless station.
5. Station mobility services whereby a station can instantly roam from one sector to another without requiring re-authentication of the station. As a wireless station moves in the coverage area space of the wireless access device, the signal strength sensed by the array controller changes. As the signal strength of the station becomes weaker, the radio associated with the adjacent sector locks in and "connects" with the station without requiring re-authentication.
6. Wireless quality of service.
7. Enhanced load balancing of wireless stations.
8. Constant RF monitoring of channel conditions and security threats
9. Wireless Security processing
10. Internal Authentication Server. Typically, authentication takes place at a server or router that is wired to the access points. In the wireless access device 100, authentication may be done by the array controller 300.
11. Wired Networking protocol support.
12. System failover handling and error handling. Because sectors overlap, when a radio fails, the adjacent radios may lock in with stations being handled by the failed radio. In some examples of the wireless access device 100, the array controller 300 may increase power to adjacent sectors to ensure coverage in any area covered by the failed sector. In addition, when multiple access devices are deployed, one wireless access device may increase power and expand a sector to cover area left without service when a radio fails in an adjacent wireless access device.
13. System management functions.

As discussed above, examples of wireless access devices and systems that employ wireless access devices described in this specification (without limitation) operate in the wireless LAN environment established by the IEEE 802.11 standardization body. The IEEE 802.11 standards including (without limitation):

IEEE 802.11, 1999 Edition (ISO/IEC 8802-11: 1999) IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications IEEE 802.11a-1999 (8802-11:1999/Amd 1:2000(E)), IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 1: High-speed Physical Layer in the 5 GHz band IEEE 802.11b-1999 Supplement to 802.11-1999, Wireless LAN MAC and PHY specifications: Higher speed Physical Layer (PHY) extension in the 2.4 GHz band 802.11b-1999/Cor1-2001, IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 2: Higher-speed Physical Layer (PHY) extension in the 2.4 GHz band—Corrigendum1

IEEE 802.11d-2001, Amendment to IEEE 802.11-1999, (ISO/IEC 8802-11) Information technology—Telecommunications and information exchange between systems—Local and metropolitan area networks—Specific requirements—Part 11: Wireless LAN Medium Access Control (MAC) and Physical Layer (PHY) Specifications: Specification for Operation in Additional Regulatory Domains IEEE 802.11F-2003 IEEE Recommended Practice for Multi-Vendor Access Point Interoperability via an Inter-Access Point Protocol Across Distribution Systems Supporting IEEE 802.11 Operation IEEE 802.11g-2003 IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 4: Further Higher-Speed Physical Layer Extension in the 2.4 GHz Band IEEE 802.11h-2003 IEEE Standard for Information technology—Telecommunications and Information Exchange Between Systems—LAN/MAN Specific Requirements—Part 11: Wireless LAN Medium Access Control (MAC) and Physical Layer (PHY) Specifications: Spectrum and Transmit Power Management Extensions in the 5 GHz band in Europe IEEE 802.11i-2004 Amendment to IEEE Std 802.11, 1999 Edition (Reaff 2003). IEEE Standard for Information technology—Telecommunications and information exchange between system—Local and metropolitan area networks Specific requirements—Part 11: Wireless LAN Medium Access Control (MAC) and Physical Layer (PHY) specifications—Amendment 6: Medium Access Control (MAC) Security Enhancements IEEE 802.11j-2004 IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 7: 4.9 GHz-5 GHz Operation in Japan All of the above-listed standards are incorporated herein by reference.

Radios operating under 802.11 may operate in one of two frequency bands: the 2.4 GHz band and the 5 GHz band. The IEEE specifies multiple channels within each band (see Table 1). Channels are defined as allocations of frequency spectrum with specified center frequencies and spacing. For example, in the 2.4 GHz band there are 14 defined channels starting at a center frequency of 2.412 GHz and incrementing up to 2.484 GHz at 5 MHz intervals. Channels are considered overlapping if their bands overlap above a certain power threshold. For instance, in the 2.4 GHz region each channel operates with a frequency band of 12 MHz on either side of the center frequency. So with 14 channels defined with center frequencies 5 MHz apart, several of them are overlapping. In fact, there are only three channels (channels 1, 6, and 11) that do not overlap in the 2.4 GHz band. Their center frequencies are 2.412 GHz, 2.437 GHz and 2.462 GHz.).

In the 5 GHz band, the IEEE Std. 802.11a-1999 defines 200 channels; each channel centered every 5 MHz from 5000 MHz to 6000 MHz. The 802.11a standard currently allows for 12 channels in the US. The 12 channels provided by 802.11a are non-overlapping channels. The FCC is expected to allocate 11 additional channels in the 5.47 to 5.725 GHz band. Those of ordinary skill in the art will appreciate that the channels described herein are for purposes of illustrating an example and not intended as any limitation on the scope of the invention. Embodiments of the present invention that are designed to implement any part of the 802.11 standard may use any set of channels specified by any part of the IEEE 802.11 standard whether such channels are available now or in the future.

TABLE 1

IEEE 802.11 U.S. Radio Channel Assignments

| Channel Number | Frequency (MHz) |
|---|---|
| IEEE 802.11 A (5.0 GHz Band) | |
| 36 | 5180 |
| 40 | 5200 |
| 44 | 5220 |
| 48 | 5240 |
| 52 | 5260 |
| 56 | 5280 |
| 60 | 5300 |
| 64 | 5320 |
| 149 | 5745 |
| 153 | 5765 |
| 157 | 5785 |
| 161 | 5805 |
| IEEE 802.11 B/G (2.4 GHz Band) | |
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |
| 13 | 2472 |
| 14 | 2484 |

The wireless access device 100 in FIG. 1 assigns channels to the sixteen radios in a manner that enhances performance, throughput, coverage area and capacity. Typical access points use one radio with a coverage area defined by an omni-directional antenna and assigned to a single channel. Therefore, all of the users in the coverage area tune in to the same channel in order to communicate with the access point. In the wireless access device 100 in FIG. 1, each radio forms a different sector defining a portion of a substantially circularly-defined coverage pattern. In addition, each radio is assigned a unique channel so that no two radios in one device communicate over the same channel.

Figure 4:
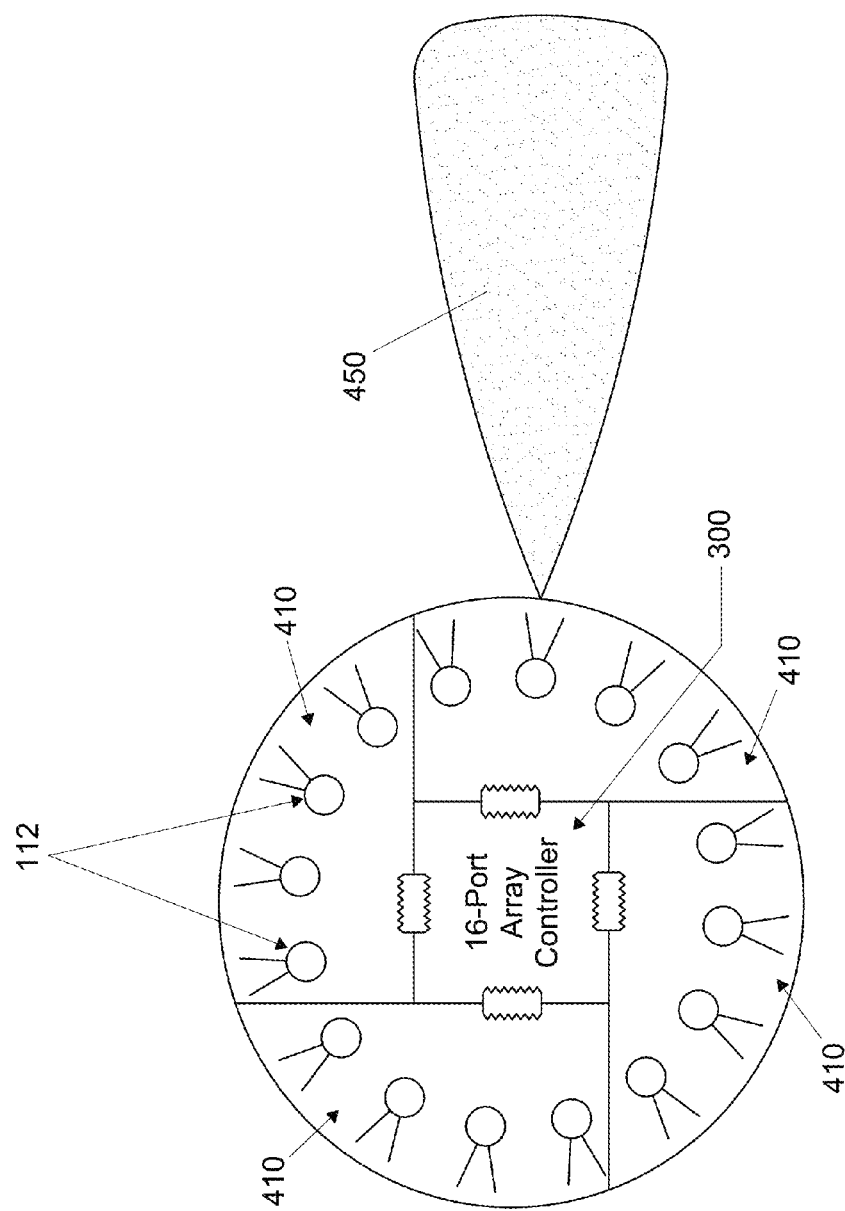
FIG. 4 is a diagram illustrating the formation of sectors by the wireless access device of FIG. 1.

FIG. 4 is a diagram illustrating the formation of sectors by the wireless access device of FIG. 1. The wireless access device 100 has 16 radios 412 divided into groups of four radios 412 mounted on each of four transceiver modules 410. An array controller 402 is located roughly in the center of the wireless access device 100 where it connects with each of the four transceiver modules 410 at inter-module connections 408. The inter-module connections 408 contain communication paths (via a bus or set of signal paths on a connector) that implement the interface between the array controller 402 and the radios 412.

As discussed, each radio 412 contains a directional antenna configured to establish a coverage area in a sector 450 that radiates out from the wireless access device 100. The radios 412 may be individually controlled such that when they are all operating they may form a coverage pattern that surrounds the wireless access device 100. The coverage pattern created by the wireless access device 100 may be similar to coverage patterns created by existing access points that use one radio radiating out of an omni-directional antenna. However, the wireless access device 100 in FIG. 4 uses sixteen radios 412 radiating out of more powerful directional antennas to create a coverage pattern area that is significantly greater than that of a typical access point. In addition, the sectors 450 created by the radios 412 in the wireless access device 100 advantageously overlap to provide features not currently available in typical access points. The radios 412 are also programmable such that they may be controlled to operate at power levels that allow for coverage patterns that are suited to the layout of the implementation. Examples are discussed below with reference to FIGS. 5A-E.

Figure 5A:
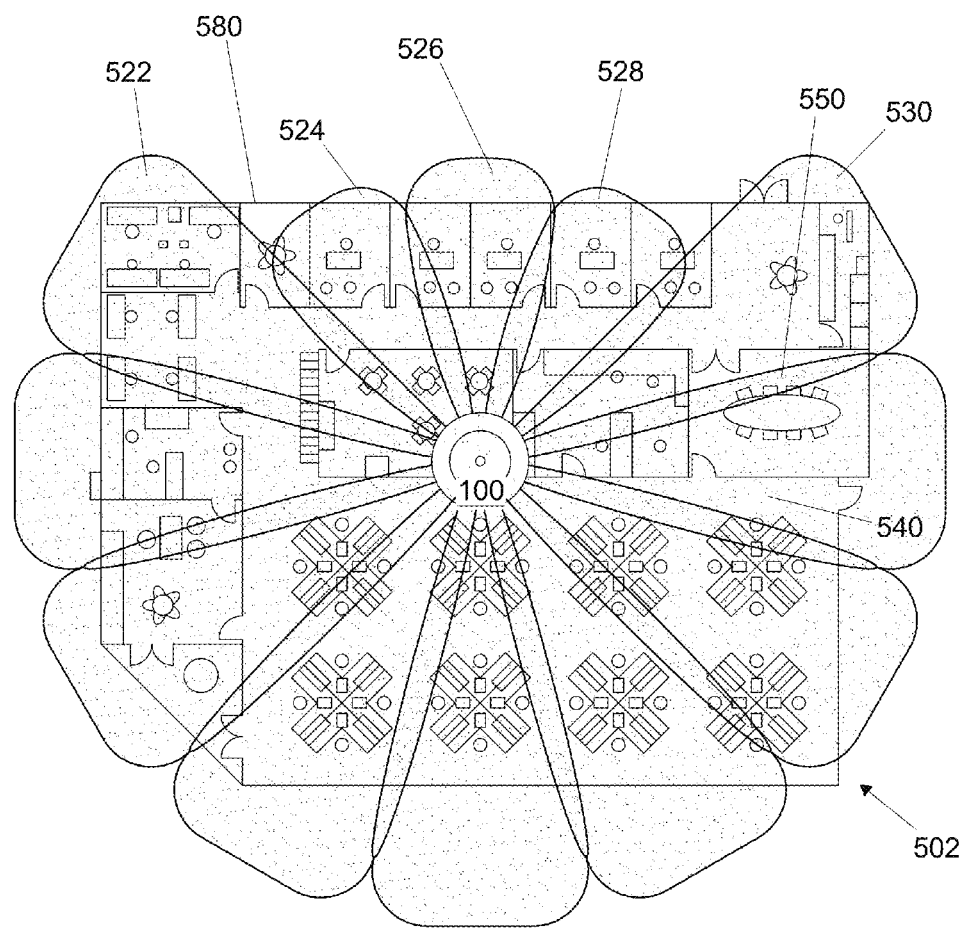
FIGS. 5A-E are diagrams illustrating examples of coverage patterns formed by an example of the wireless access device of FIG. 1.

In FIG. 5A, a wireless access device 100 is implemented in an implementation I with all of the radios in the wireless access device 100 configured to communicate with stations within a coverage area 502. The radios in the wireless access device 100 form sectors. A first sector 530 is shown with an adjacent sector 540 along with an area of overlap 550 formed by the overlap of the first and second sectors 530, 540. FIG. 5A illustrates one of many advantages that the wireless access device 100 has over typical access points. The wireless access device 100 includes programmable and configurable control over the operation of the radios on the wireless access device 100. When deployed, the wireless access devices 100 may be configured to create a coverage pattern that is suitable for by the exact implementation I. For example, in FIG. 5A, the coverage pattern 502 has been configured to conform to the implementation I. The wireless access device 100 may be configured such that the radios that create a set of coverage patterns 522, 524, 526, 528, 530 that project towards a side 580 communicate signals at a lower power limiting the extent of the coverage area created by each radio. This is illustrated by a set of middle sectors 524, 526, 528 covering less distance than outer sectors 522, 530, which cover the corners or the implementation I along the side 580. This implementation I advantageously substantially limits the ability for a station to connect from beyond the wall along the side 580 of implementation I.

Figure 5B:
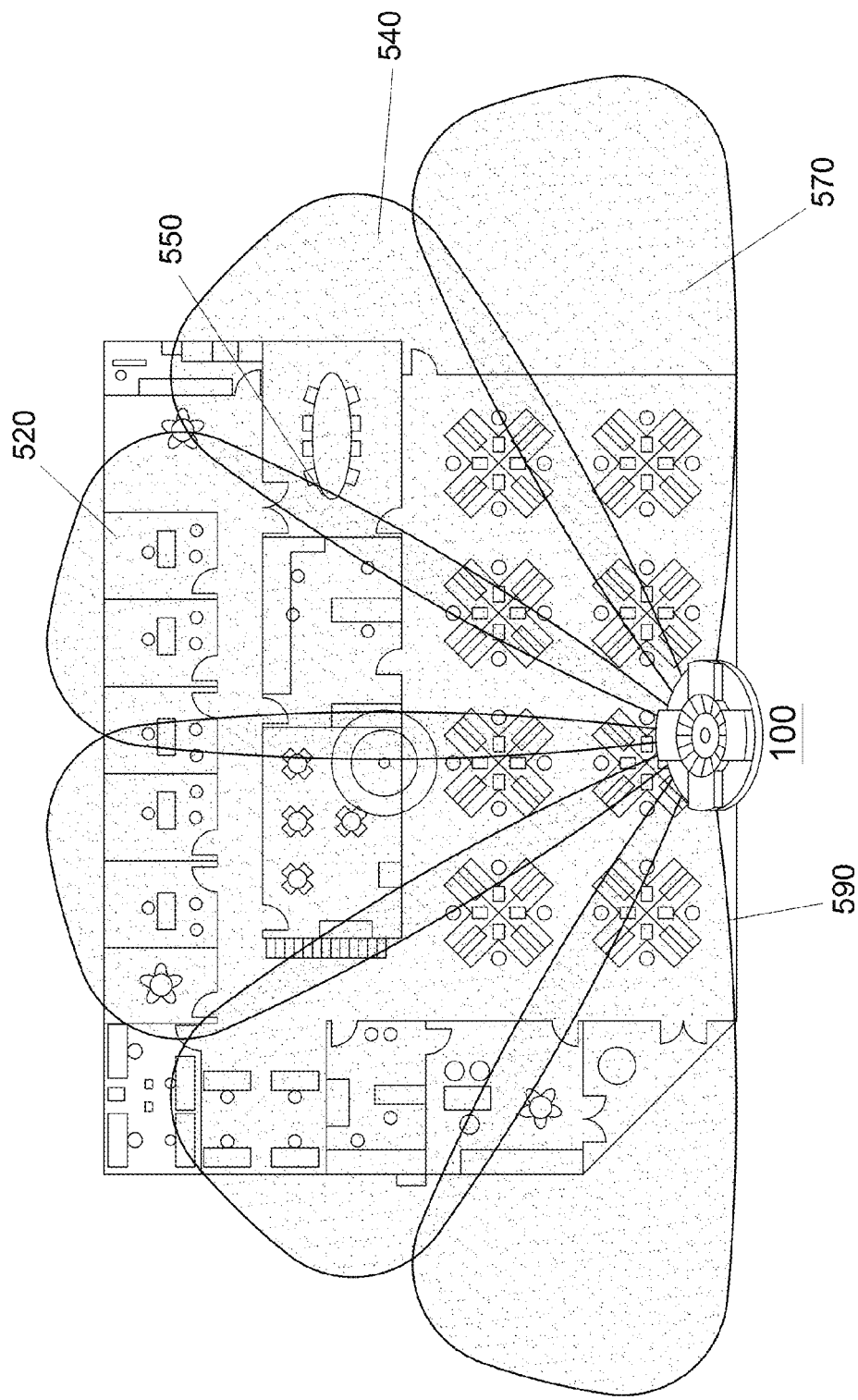

FIG. 5B illustrates how the wireless access device 100 may be configured to provide special features in a specific implementation. In FIG. 5B, the wireless access device 100 is implemented in a space 570 in which the resident desires to have wireless Internet access. The space 570 is located with one side 590, which faces an open and public area from which hackers or otherwise unauthorized users may attempt to gain access to the Internet via the wireless access device 100. The wireless access device 100 may be used to provide users in the space 570 with access to the Internet while limiting access by those on the other side of 590. One way as illustrated in FIG. 5B is to place the wireless access device 100 along the side 590 and turn off radios that would create sectors on the other side of 590, and turn on the radios that create sectors in the space 570. Such an implementation would yield a coverage pattern similar to the one shown in FIG. 5B.

Figure 5C:
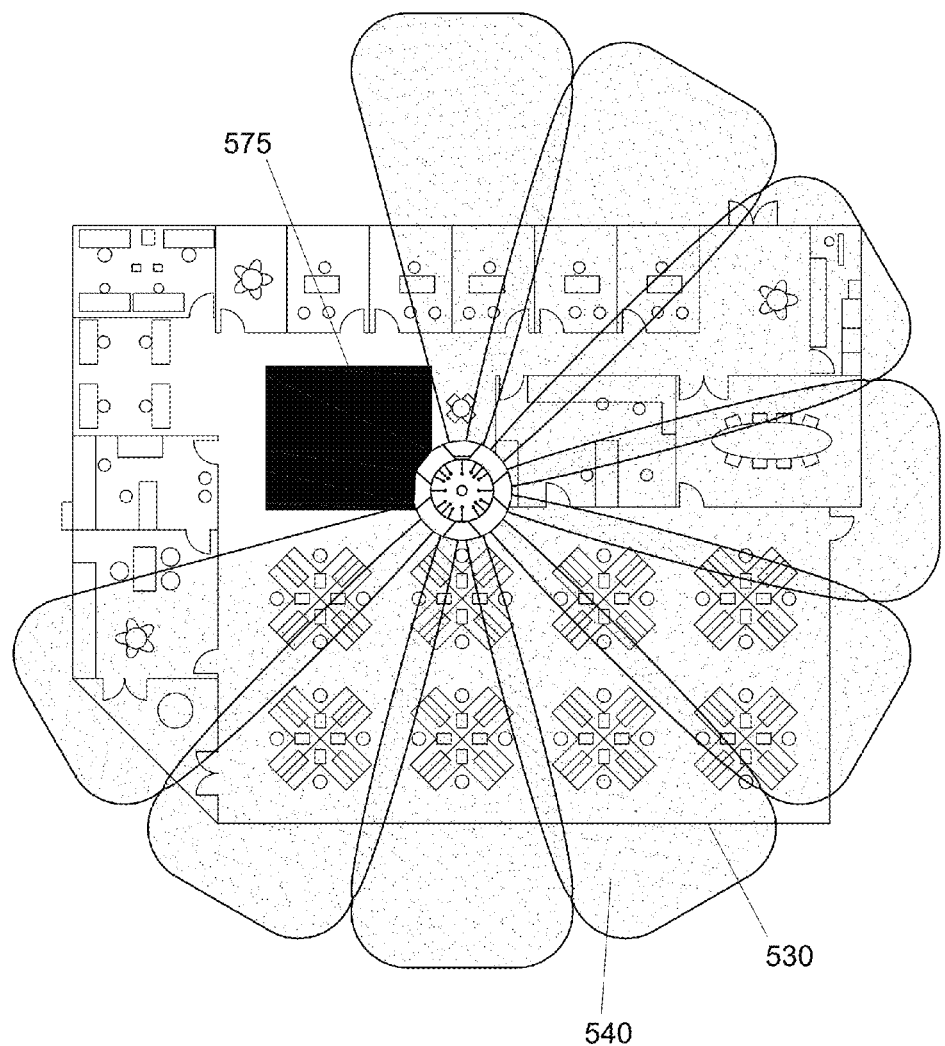

FIG. 5C shows how the wireless access device 100 may be configured to limit the affects of obstacles that may cause reflections in the radio signals. Reflections in typical access points may cause multi-path interference. When radio signals reflect off of obstacles, the reflections may reach the station as different signals coming from different directions, or multiple paths. The wireless access device 100 may be configured to avoid multi-path interference by configuring the radios to avoid generating sectors that could reach the obstacle. In FIG. 5C, the wireless access device 100 is shown generating sectors 520, 540, but not generating any sectors in the direction of obstacle 575.

Figure 5D:
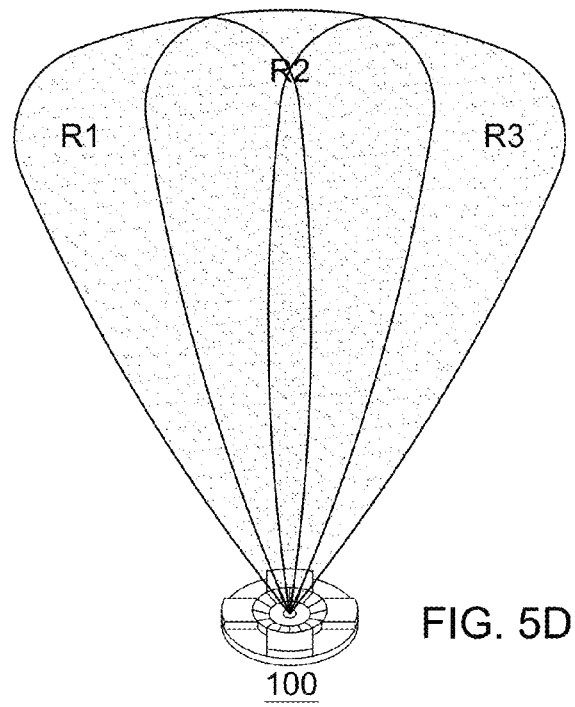
Figure 5E:
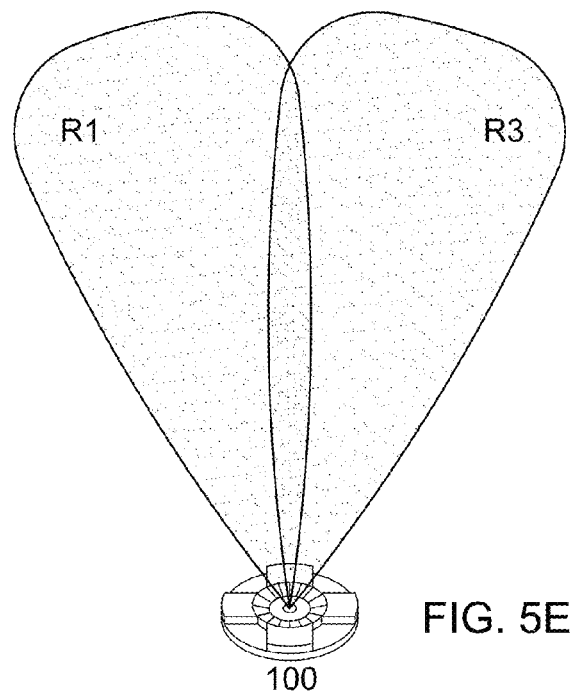

FIG. 5D illustrates how overlapping sectors may be used to provide radio frequency failover so that stations do not lose connectivity when a radio fails, or is otherwise unavailable. In FIG. 5D, wireless access device 100 has three radios creating a sector each (R1, R2, R3). In FIG. 5E, the wireless access device 100 has lost the radio associated with sector R2. However, sectors R1, R2, R3 advantageously overlap. The wireless access device 100 may switch stations in sector R2 that were connected via the radio that generated sector R2 to the radios that created either of sectors R1 or R3.

Figure 6A:
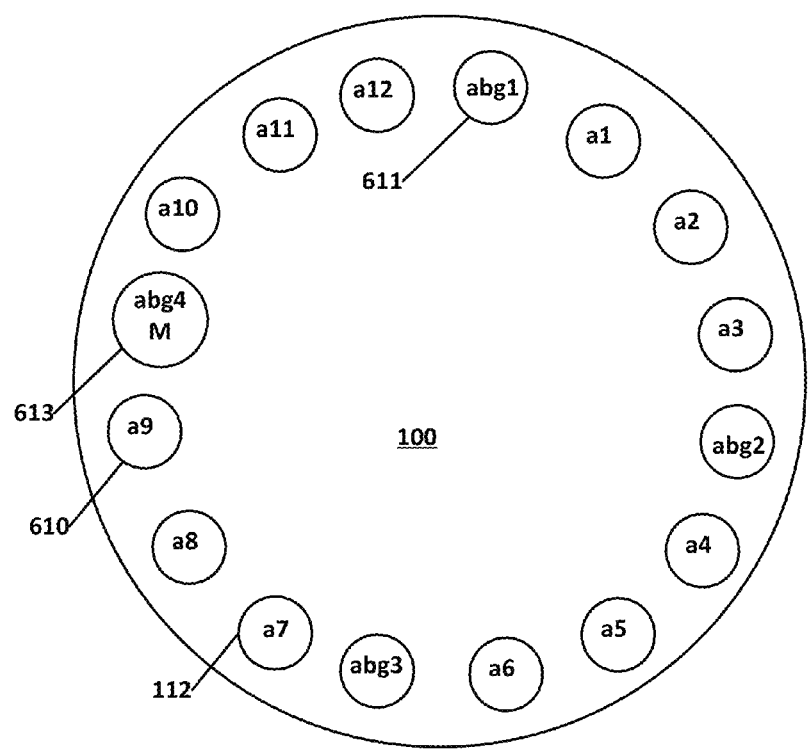
FIG. 6A is a diagram of a wireless access device of FIG. 1 labeled by radio type and number.

FIG. 6A is a diagram of a wireless access device 100 of FIG. 1 labeled by radio type and number. Radios that communicate, or are configured to communicate, as 802.11a radios only are labeled 'a.' Radios that may be programmed or configured to communicate using 802.11a, b, or g radios are labeled 'abg.' The twelve 'a' radios 610 (a1-a12) are assigned a unique one of the twenty-three channels available under the 802.11a standard. Three of the four 'abg' radios are assigned the three non-overlapping channels available under the 802.11b/g standards. The fourth 'abg' radio is implemented as an omni-directional radio in listen mode exclusively.

FIGS. 6B-6D show coverage patterns formed by the different radio types on the wireless access device. In FIG. 6B, the twelve 'a' radios 610 each have a coverage area emanating in a sector that spreads out more than 30°. The sectors of the twelve 'a' radios 610 may combine to form a substantially circular 802.11a coverage pattern 620. Preferably, the sectors are larger than 30° in order to create overlap between the sectors, such as for example, the overlap 650 between sectors 630 and 640. FIG. 6C shows the three 'abg' radios 611 with the coverage area of more than 120°. The sectors combine to provide a 360° coverage pattern 660. However, each sector is more than 120° to create overlap between the sectors. In FIG. 6D, the fourth 'abg' radio 613 is configured as an omni-directional radio able to communicate in all directions. The fourth 'abg' radio 613 is used as a monitor or a sniffer radio in a listen-only mode. This radio listens to each channel in sequence to build a table of all stations and access devices. This table may be compared to an administrator controlled list of allowed stations and access devices. Stations and access devices not in the administrator controlled list are termed rogues. One function performed by the fourth 'abg' radio 613 is to detect unauthorized stations in the coverage area.

Figure 7:
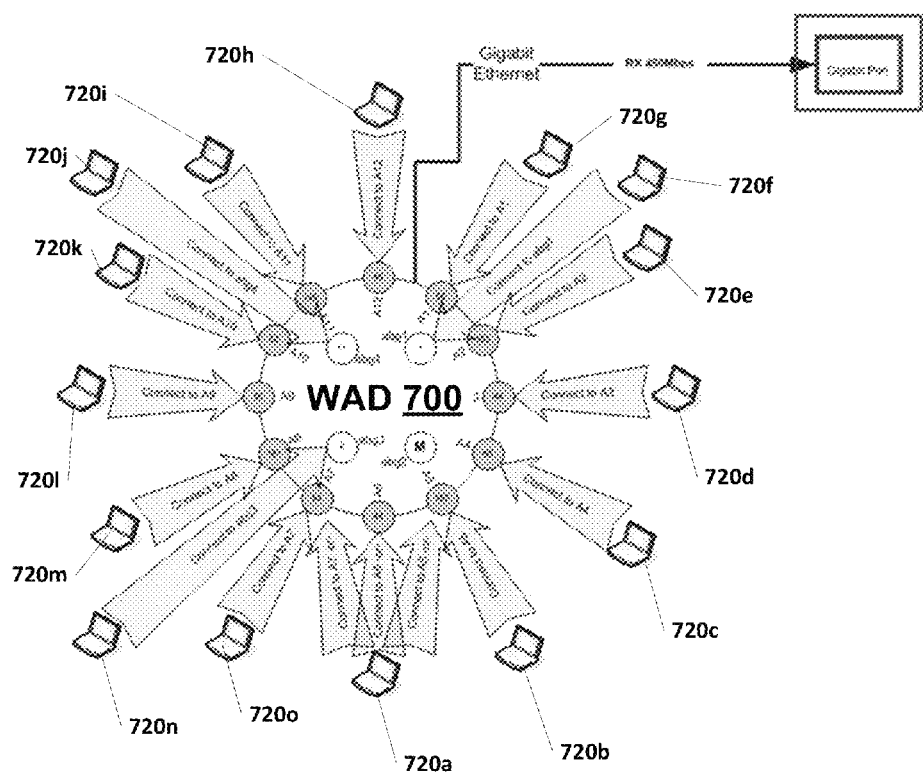
FIG. 7 illustrates operation of a wireless access device.

FIG. 7 is a diagram of a wireless access device 700 connected wirelessly to a plurality of stations 720a-o via channels allocated to the plurality of radios a1-a12, afg1-afg4 on the wireless access device 700. The radios are labeled according to their type and radio numbers. Inside the circles representing the radios are numbers identifying the channels assigned to the radio. As shown, radios a1-a12 and afg1-afg4 are assigned channels as shown in Table 2 below:

TABLE 2

| Radio No. | Channel | Frequency (MHz) |
| --- | --- | --- |
| A9 | 36 | 5180 |
| A12 | 40 | 5200 |
| A3 | 44 | 5220 |
| A6 | 48 | 5240 |
| A10 | 52 | 5260 |
| A1 | 56 | 5280 |
| A4 | 60 | 5300 |
| A7 | 64 | 5320 |
| A11 | 149 | 5745 |
| A2 | 153 | 5765 |
| A5 | 157 | 5785 |
| A8 | 161 | 5805 |
| M | — | Monitor radio that can listen on any abg channel |
| abg1 | 1 | 2412 |
| abg3 | 6 | 2437 |
| abg4 | 11 | 2462 |

The radios in the wireless access device 700 are advantageously assigned different channels. The radios in FIG. 7 and the array controller (described above with reference to FIG. 3) are housed within a single enclosure tightly coupled by digital bus. The housing provides a central control point for the sixteen radios that is not tethered by any cabled bus.

The stations 720a-o in FIG. 7 represents stations attempting to connect to the wireless access device 700. The arrows indicate the stations' ability to connect to a particular radio as well as the ability of the station to communicate using the appropriate protocol (i.e. 802.11a, b, or g). To illustrate, station 720a is a target wireless client attaching to the wireless access device 700 using protocols specified by 802.11a. Radios a5, a6, and a7 generate sectors that preferably overlap such that station 720a may connect to either one of the three radios. Each radio is assigned a unique channel that does not overlap with any other channel.

If the radio to which station 720a fails, or is otherwise unable to provide service to station 720a, the array controller is able to switch the connection to station 720a over to one of the adjacent radios. The IEEE 802.11a, b, and g protocols permit radios to "listen" to signals being communicated with stations that are connected to another radio. The array controller may obtain data such as signal strength and directional awareness and other factors that allow it to determine which radio is best suited to continue communicating with the station 720a.

The wireless access device 700 is connected to a Gigabit Ethernet port 780, which provides a direct connection to the user's network.

The radios in the wireless access device 700 are advantageously enclosed in proximity to one another providing the wireless access device 700 with increased throughput, capacity and coverage area. In order to minimize interference between radios, each radio is assigned a unique channel. To further minimize the likelihood of interference, radios may be assigned channels according to a channel allocation scheme.

Figure 8:
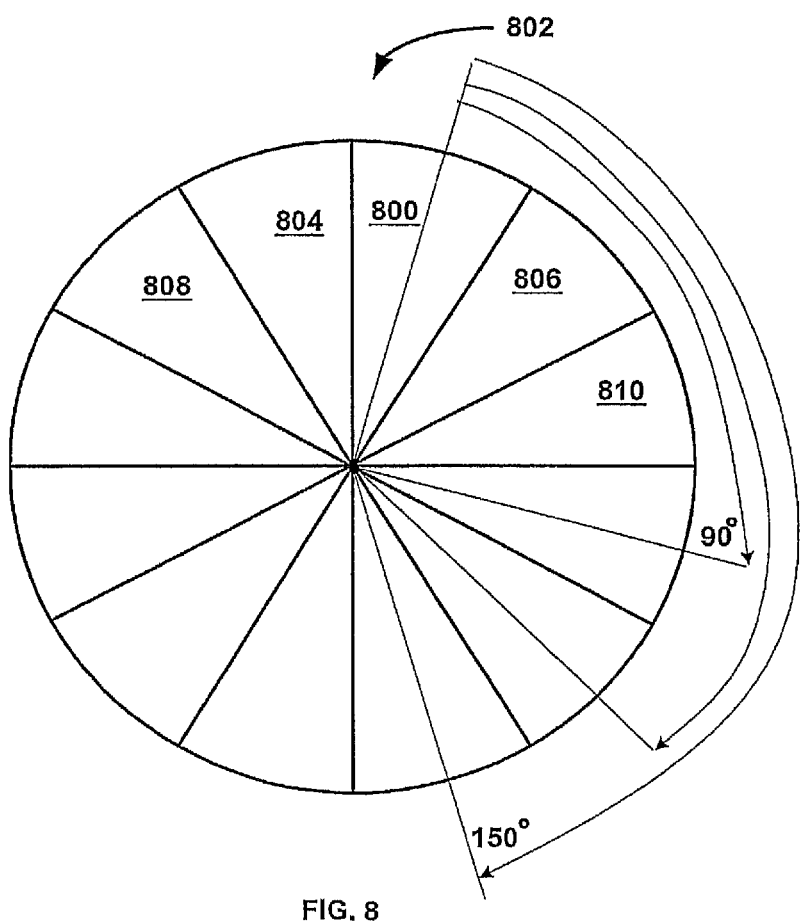
FIG. 8 illustrates operation of channel allocation in an implementation of the wireless access device.

To illustrate a scheme for allocating channels so as to minimize interference, reference is made to FIG. 8, which shows a top view of a wireless access device 802 having 12 radios. A first radio 800 in the wireless access device 802 is between a first adjacent radio 804 and a second adjacent radio 806. Adjacent to the second adjacent radio 806 is a fourth radio 810 and adjacent to the first adjacent radio 804 is a fifth radio 808. Each of the twelve radios in the wireless access device 802 is tuned to a unique IEEE 802.11a channel.

A channel is the 20 MHz band of frequencies surrounding a specified center or carrier frequency. The channel consists of 18 MHz of actively used frequencies and 2 MHz of guard band. A channel number in the five GHz band is the number derived by subtracting 5 GHz from the channel center frequency and dividing the result by 5. Table 1 shows the channel numbers and corresponding center frequencies for each channel as defined in the IEEE 802.11a and 802.11b/g standards.

With the radios in close proximity, the operation of the wireless access device 802 may generate co-channel interference, which is a signal generated outside a given channel that lies in the adjacent channel or channels. In the 802.11a bands, co-channel interference is that part of the transmission spectrum that lies between −10 MHz and −30 MHZ and or that part of the transmission spectrum that lies between 10 MHz and 30 MHZ. The wireless access device 802 in FIG. 8 advantageously implements a scheme that minimizes co-channel interference.

In the wireless access device 802, the first radio 800 may be set to a first channel. The adjacent channel is the 20 MHz band of frequencies lying just above or just below the subject channel. As an example, channels 36 and 44 are adjacent to channel 40. In order to minimize interference, the wireless access device 802 assigns channels to the radios without using adjacent channels. That is, if a channel is assigned to a radio, the wireless access device 802 avoids using an adjacent channel to that channel. To the extent the use of adjacent channels cannot be avoided, an adjacent channel may be assigned with a radial separation of between 90° and 150°.

In one example implementation, a channel allocation scheme may start by setting the first radio 800 (in FIG. 8) to a specific channel. The two adjacent radios 804, 806 may then be assigned channels that are a minimum number ($n_{ch}$) of channels away. If $n_{ch}$ is 4, the adjacent radios 804, 806 are assigned channels that are at least 80 MHz away. The next adjacent radios 808, 810 may then be assigned channels that are at least 40 MHz or 60 MHz (a smaller number $n_{cha}$) away from the first radio 800.

In one example channel mapping scheme, the radios of a twelve radio circular array may be assigned to the twelve channels of the 802.11a 1999 specification. If $n_{ch}$=16 and $n_{cha}$=12, co-channel assignment is limited to radios placed at 90, 120 and 150 degrees, approximately 25,248 mapping schemes may be generated. An example of one of those schemes is shown below in Table 3.

TABLE 3

| Radio Number | Channel No. |
|---|---|
| 1 | 36 |
| 2 | 52 |
| 3 | 149 |
| 4 | 40 |
| 5 | 56 |
| 6 | 157 |
| 7 | 44 |
| 8 | 60 |
| 9 | 153 |
| 10 | 48 |
| 11 | 64 |
| 12 | 161 |

The maps can be generated once and stored in non-volatile memory for use as needed or can be generated on the fly by a recursive program running on the array control computer. For example, a computer program may be implemented that generates, in sequence, all possible channel assignment for a circular, arbitrary-sized array of radios and searches the possible assignments for channel maps which have the largest possible values of $n_{ch}$ and $n_{cha}$ while also avoiding the use of adjacent data channels, where possible, and by limiting their positions, when avoidance is not possible, to locations that fall between 90 degrees and 150 degrees of radial separation. This process determines a number of map candidates sharing equally advantageous $n_{ch}$ and $n_{cha}$ values. The map to be used by the access device may then be selected at random, for example, using a random number generation function from the set of equally advantageous maps.

The selected channel allocation map may be applied to the radios of the wireless access device 800 array.

Interference may also come from foreign associated stations (stations associated with other wireless access devices), other wireless access devices, or sources not related to the wireless access device. An example of a system for allocating channels in a multi-radio circular wireless access device may be extended to optimize performance in the presence of other wireless access devices and/or wireless LAN access points and/or foreign-associated clients and/or sources of radio interference not emanating from wireless LAN devices. Several factors and calculations should be defined.

First, the RSSI may be monitored by the wireless access device. The RSSI is the receive signal strength in DBm. For wireless access devices, the number falls between −30 DBm and −95 DBm with −30 DBm being the strongest signal. The wireless access device may also determine a non wireless access device signal duty cycle, which is the percentage of time that the radio receives energy above −85 DBm from signal sources not recognized as that of the wireless access device. The channel usage factor is a number obtained from the calculation of [(Packet length/bit rate)*(100+RSSI)]+ [(Non wireless access device Signal Duty Cycle)*70]. The spectrum usage matrix is a tabulation of the channel usage factor measured for each radio in an array of radios on each channel potentially available for use by said radio. The channel map quality score is the number calculated for each possible channel mapping scheme by summing the channel usage factors for each radio measured on the channel designated for that radio by the channel mapping scheme. The number will lie between 0 (for no interfering signals on any channel) and 70 times the number of radios (for all channels experiencing severe interference).

Figure 9:
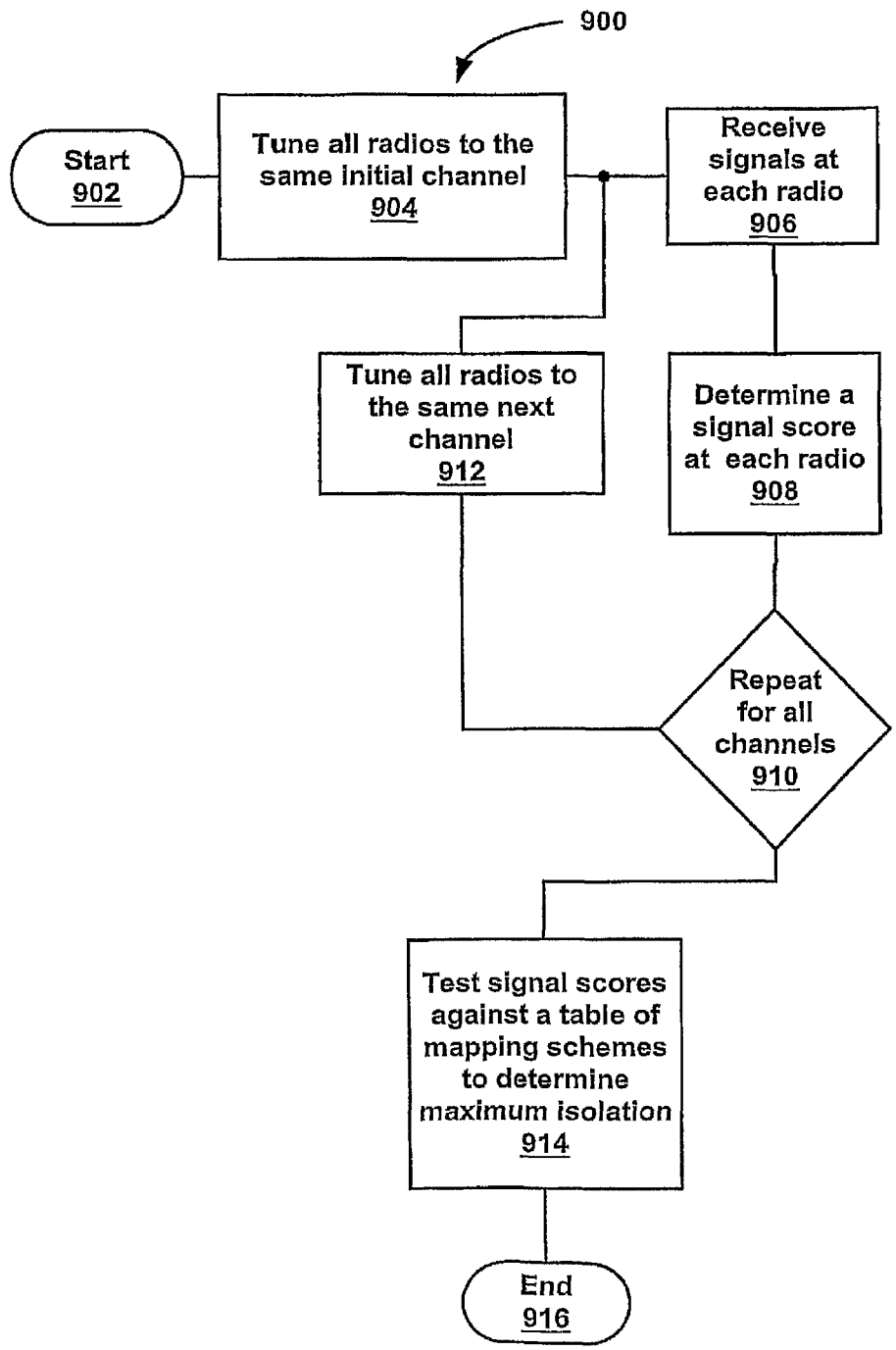
FIG. 9 is a flowchart of an example of an implementation of a method performed by a wireless access device.

FIG. 9 is a flowchart 900 of an example implementation of a method performed by the wireless access device. As an example, when the wireless access device powers up (step 902), all radios in the wireless access device may be tuned to the same channel (such as channel 36) (step 904). The radios all listen for signals from any source arriving on this channel. Radios whose antennas are oriented towards the possible emitting source will receive substantially more signal than those not so oriented. Each radio receives the signal (906). Each radio then determines a signal score, i.e. each radio's Channel Usage Factor, which is recorded in a table (step 908). All of the radios are then tuned to the next channel (step 912). The radios receive the signals (step 906) and each radio determines the channel usage factor for the channel (908), and expands the table of channel usage factors. The process is repeated and each time, a check is performed to see if all of the channels have been used (step 910). When all of the channels have been used, the channel usage factors are tabulated in a spectrum usage matrix. The process continues by testing the spectrum usage matrix against a table of possible mapping schemes that provide approximately maximum isolation (step 914). The wireless access device then sets the radios to the channel scheme that is most appropriate for the situation of the environment.

Each possible allocation map is weighted by calculating its Channel Map Quality Score. The Channel Allocation Maps having the best Channel Map Quality Score is chosen. Several Channel Allocation Maps may share the same Channel Map Quality Score and, therefore, be equally advantageous. The map to be used by the access device may then be selected at random, for example, using a random number generation function from the set of equally advantageous maps.

The following illustrates one example of a process for allocating channels in a wireless access device.

Channel Allocation in a Wireless Access Device

Step 1:
Determine all possible channel maps (preferably using a recursive computer program.)
Initialize the computer variable NoCoChannels to false.
Step 2:
Examine the first channel map and find the number of co-channels that are used. (co-channels, or adjacent channels, are channels that are 20 MHz away from any other channel.)
If this value is zero, set a computer variable: NoCoChannels to true.
If this value is not zero, find the largest and smallest angles between co-channels.
  If the largest angle is greater than 150 degrees eliminate this map from consideration and go to Step 3.
  If the smallest angle is less than 90 degrees eliminate this map from consideration and go to Step 3.
Find the lowest value of $N_{ch}$ for any radio in the first channel map this is the $N_{ch}$ score for the first map.
Store this value in a computer variable: $MaxN_{ch}$
Find the lowest value of $N_{cha}$ for any radio in the first channel map this is the $N_{cha}$ score for the first map.
Store this value in a computer variable: $MaxN_{cha}$
Step 3:
Examine a second channel map and find the number of co-channels that are used.
If this value is zero, set the computer variable: NoCoChannels to true
If this value is not zero, and the computer value NoCoChannels is true eliminate this map from consideration and go to Step 4.
Otherwise, if this value is not zero, find the largest and smallest angles between co-channels.
  If the largest angle is greater than 150 degrees eliminate this map from consideration and go to Step 4.
  If the smallest angle is less than 90 degrees eliminate this map from consideration and go to Step 4.
Otherwise, find the lowest value of $N_{ch}$ for any radio in the second channel map this is the $N_{ch}$ score for the second map.
If the $N_{ch}$ value is greater than the stored value of $MaxN_{ch}$ replace $MaxN_{ch}$ with this larger value and also find the lowest value of $N_{cha}$ for any radio in the second channel map this is the $N_{cha}$ score for the second map. Store this value in a computer variable $MaxN_{cha}$
If the $N_{ch}$ value is equal to the stored value of $MaxN_{ch}$ find the lowest value of $N_{cha}$ this is the $N_{cha}$ score for the second map. Store this value in a computer variable $MaxN_{cha}$
If the $N_{ch}$ score is less than $MaxN_{ch}$ do not evaluate $N_{cha}$ and eliminate this map from consideration
Step 4:
Examine the next channel map and find the number of co-channels that are used.
If this value is zero set the computer variable NoCoChannels to true
If this value is not zero and the computer value NoCoChannels is true eliminate this map from consideration and go to Step 5.
Otherwise if this value is not zero find the largest and smallest angles between co-channels.
  If the largest angle is greater than 150 degrees eliminate this map from consideration and go to Step 5.
  If the smallest angle is less than 90 degrees eliminate this map from consideration and go to Step 5.
Otherwise, find the lowest value of $N_{ch}$ for any radio in the channel map this is the $N_{ch}$ score for the map.
If the $N_{ch}$ score is greater than the stored value of $MaxN_{ch}$ replace $MaxN_{ch}$ with this larger value and also find the lowest value of $N_{cha}$ for any radio in the this channel map this is the $N_{cha}$ score for the map. Store this value in the computer variable $MaxN_{cha}$ and eliminate all previously examined maps from consideration.
If the $N_{ch}$ value is equal to the stored value of $MaxN_{ch}$ find the lowest value of $N_{cha}$ this is the $N_{cha}$ score of the map. If it is greater than the stored value of $MaxN_{cha}$ replace $MaxN_{cha}$ with this value and eliminate all previously examined maps from consideration.
If the $N_{ch}$ score is less than $MaxN_{ch}$ do not evaluate $N_{cha}$ and eliminate this map from consideration.
Step 5:
Repeat Step 4 for each of the many (usually many thousands) of possible channel maps. The results of this iterative process are:
  If any channel map does not use co-channels then all maps having co-channels will be eliminated from consideration.
  $MaxN_{ch}$ will grow to be the largest possible value for an $N_{ch}$ score $MaxN_{cha}$ will grow to be the largest possible value for an $N_{cha}$ score among maps having the largest possible $N_{ch}$ score.
  All channel maps whose $N_{ch}$ score is not equal to $MaxN_{ch}$ and whose $N_{cha}$ score is not equal $MaxN_{cha}$ will be eliminated from consideration.
The result of this process yields only the most advantageous channel maps (that is, those having the largest $N_{cha}$ from among those having largest $N_{ch}$ score). There may be many channel maps sharing the same most advantageous scores.

The chosen Channel Allocation map is applied to the radios of the wireless access device.

Referring to FIG. 8, the wireless access device 802 is capable of utilizing the error vector measurement ("EVM") data in improving the performance of the radios in the wireless access device 802. It is appreciated by those skilled in the art that the EVM is not a function of the ambient conditions, and that the EVM is a performance measure defined by the specification of IEEE 802.11.

In an example of operation, the first radio 800 may transmit a signal that is received by any of the other radios in the wireless access device 802. As an example, if a second radio 804 receives the transmitted signal, the second radio 804 may calculate the EVM of the second radio by comparing the received signal (from the transmitted signal) at the second radio with the known characteristics of the transmitted signal at the first radio. This method compensates for variations in gain characteristics of the different amplifiers and receivers in the wireless access device 802 by providing a comparison of the radios based on the measured EVM. This comparison may allow for a maximum allowable transmit power to be varied to each radio circuit to allow for the highest transmit rates for the EVM. The EVM for each radio may be stored in a table in the memory of the wireless access device 802 and used for improving the performance of the radios.

The EVM for each radio may be used for channel allocation in manner similar to the manner in which the Channel Usage Factor is used in the example described with reference to FIG. 9. The EVM may be compared against a predefined table in the wireless access device 802 as described above. Instead of calculating the channel usage factor, the EVM may be calculated for each radio at each channel for a signal transmitted by each of the other radios. Once these values are known, EEPROMs may be programmed with the information and included in each radio circuit. The EVM values may be tested against possible mapping schemes that provide approximately maximum isolation. The wireless access device 802 then sets the radios the channel scheme that is most appropriate for the characteristics of each radio.

Although the controller 300 depicted in FIG. 3 uses memory, one skilled in the art will appreciate that a substantial part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed. Further, although specific components of wireless access device 100 are described, one skilled in the art will appreciate that a network access device suitable for use with methods, systems, and articles of manufacture consistent with the present invention may contain additional or different components.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A method for allocating channels in a wireless access device having a plurality of radios capable of operating on a plurality of channels, the method comprising:
   initially tuning each of the plurality of radios to a selected same one of the plurality of channels;
   transmitting a signal at the selected same channel from a transmitting one of the plurality of radios;
   receiving the signal at the selected same channel on the plurality of radios that are not the transmitting radio;
   determining an error vector measurement ("EVM") for each one the plurality of radios that are not the transmitting radio;
   storing the EVM for each one of the plurality of radios that are not the transmitting radio for the selected same channel for the transmitting radio;
   selecting a next one of the plurality of radios to transmit the signal at the same selected channel;
   repeating the steps of transmitting the signal at the selected same channel, receiving the signal at the selected same channel, determining the EVM, storing the EVM, and selecting the next radio until each one of the plurality of radios has transmitted the signal at the same selected channel;
   tuning each of the plurality of radios to another one of the plurality of channels;
   repeating the steps of transmitting the signal at the selected same channel, receiving the signal at the selected same channel, determining the EVM, storing the EVM, selecting the next radio, and tuning the plurality of radios to the other one of the plurality of channels until each channel has been used; and
   testing the EVM scores against a table of mapping schemes to determine maximum isolation.

2. A method according to claim 1 where the EVM scores for each radio at each channel is stored in memory for use in determining highest transmit rates by varying a maximum allowable transmit power in each radio.

3. A method according to claim 1 where the step of calculating the EVM comprises:
   at each one of the plurality of radios that is not transmitting the signal at the selected same channel, determining characteristics of a received signal;
   retrieving characteristics of a transmitted signal at the selected same channel;
   comparing the characteristics of the received signal with the characteristics of the transmitted signal;
   determining the EVM based on the comparison.

* * * * *